(12) United States Patent
Yamazaki

(10) Patent No.: US 7,424,834 B2
(45) Date of Patent: Sep. 16, 2008

(54) GEAR, METHOD AND DEVICE FOR MANUFACTURING THE SAME

(75) Inventor: Shinya Yamazaki, Nagoya (JP)

(73) Assignee: O-OKA Corporation, Toyota-shi (JP)

( * ) Notice: Subject to any disclaimer, the term of this patent is extended or adjusted under 35 U.S.C. 154(b) by 190 days.

(21) Appl. No.: 10/639,640

(22) Filed: Aug. 13, 2003

(65) Prior Publication Data

US 2004/0099078 A1    May 27, 2004

(51) Int. Cl.
*F16H 55/00* (2006.01)
*F16H 3/38* (2006.01)

(52) U.S. Cl. ............................. 74/431; 74/339; 192/69.9

(58) Field of Classification Search .................... 74/431, 74/89.16, 333, 339; 29/893, 893.3, 893.33, 29/893.34; 192/108, 53.34, 69.9
See application file for complete search history.

(56) References Cited

U.S. PATENT DOCUMENTS 3,915,033 A * 10/1975 Polak ......................... 475/66
4,732,247 A * 3/1988 Frost ........................ 192/53.31
4,793,200 A * 12/1988 McDonald .................... 74/331
4,938,089 A * 7/1990 Ohoka .......................... 74/339
5,209,333 A * 5/1993 Molitor ...................... 192/69.9
6,432,017 B1 * 8/2002 Shimomura ................. 475/160
2004/0079610 A1 * 4/2004 Ooka .......................... 192/108

FOREIGN PATENT DOCUMENTS

EP    0552021 A1 * 1/1993
JP    4-203533      * 7/1992

* cited by examiner

*Primary Examiner*—Richard W L Ridley
*Assistant Examiner*—Justin Krause
(74) *Attorney, Agent, or Firm*—Oblon, Spivak, McClelland, Maier & Neustadt, P.C.

(57) ABSTRACT

A gear, a method and a device having a transmission gear part and a hub synchro having a spline teeth formed on an outer peripheral surface thereof and plurality of key holes formed in the opposite side of the transmission gear part, in which the hub synchro is coaxially provided with said transmission gear part, the diameter of the hub synchro is smaller than that of the transmission gear part, and the spline teeth and the plurality of key holes on the hub synchro are formed by forging.

9 Claims, 4 Drawing Sheets work W work W

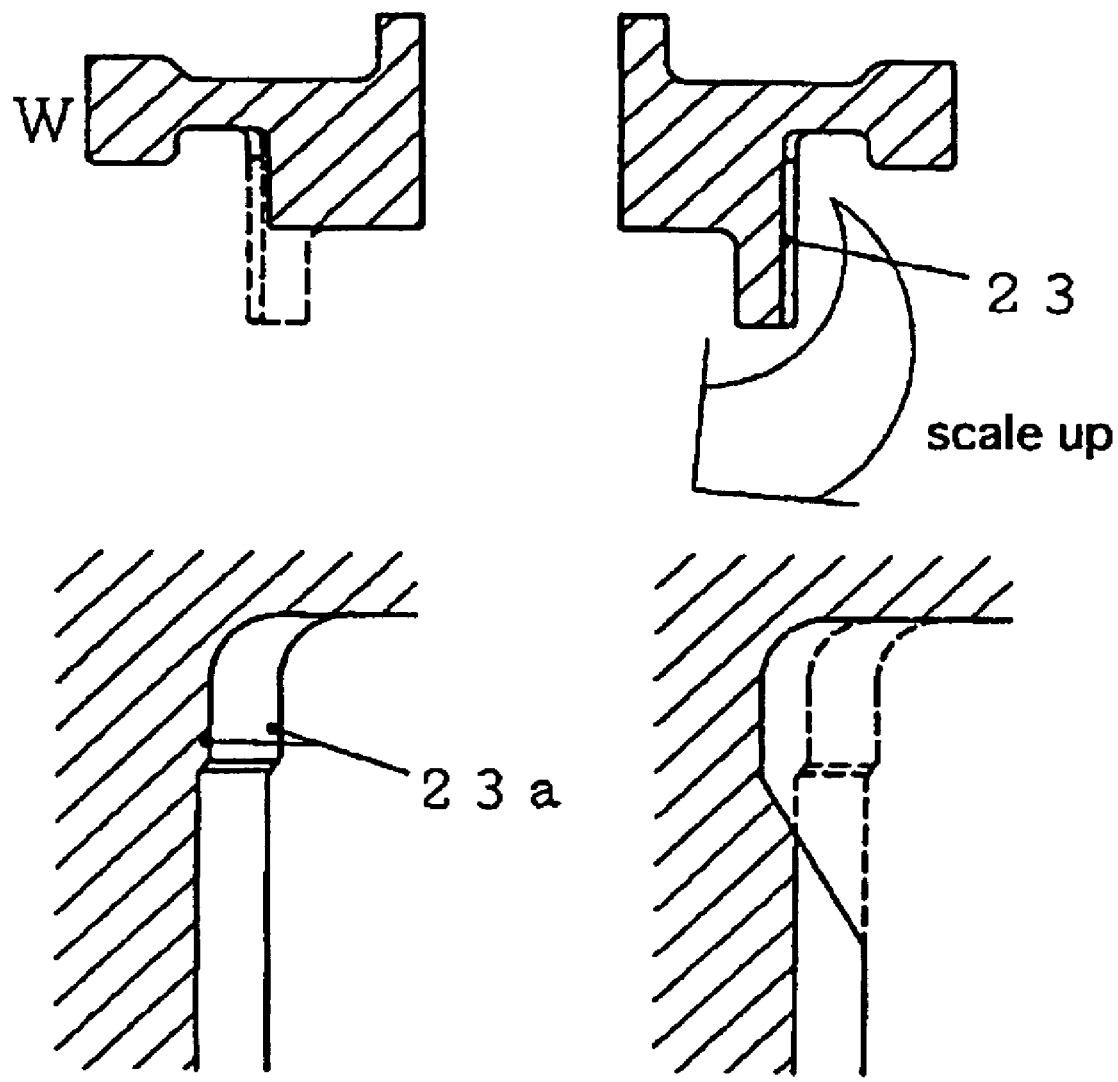

GEAR, METHOD AND DEVICE FOR MANUFACTURING THE SAME

BACKGROUND OF THE INVENTION

1. Field of the Invention

The present invention relates to a transmission gear part called an idler reverse gear (hereinafter referred to as an idler reverse gear), a method and a device for manufacturing the same.

2. Description of the Prior Art

An idler reverse gear of prior art was made by uniting a transmission gear part and a hub synchro with a spline teeth for a synchro, which were formed individually, namely the transmission gear and the hub synchro were combined by an electron beam welding or fitting means.

The spline teeth for synchro formed on an outer peripheral surface of the hub synchro was formed only out of an area of a sink part.

There are many problems that the above prior arts need two times parts in order to form a transmission gear part and a hub synchro for a synchro individually and many and large investments of equipments owing to a build up process.

Moreover, it is difficult to secure the strength and the accuracy on uniting the transmission gear part and the hub synchro. For example, there are problems such as a strain due to heat on an electron beam welding, a phase lag of a teeth form and a shortage of strength against a torsion torque on a fitting means.

It is able to form a one-piece product having a transmission gear part and a hub synchro by cutting. Although, the above described method is inefficient and causes a high cost.

SUMMARY OF THE INVENTION

It is a main object of the present invention to provide a gear for example a reliable idler reverse gear formed by taking advantages of a forging process.

It is an object of the present invention to provide a gear comprising a transmission gear part and a hub synchro having a spline teeth formed on an outer peripheral surface thereof and plurality of key holes formed in the opposite side of the transmission gear part, in which the hub synchro is coaxially provided with the transmission gear part, the diameter of the hub synchro is smaller than that of the transmission gear part, and the spline teeth and the plurality of key holes on the hub synchro are formed by forging.

An idler reverse gear according to the present invention has the high rigidity and the high reliability due to one-piece molded article by forging.

It is another object of the present invention to provide a gear having an annular groove as a sink part formed between the transmission gear part and the outer peripheral surface of the hub synchro on an axial one end thereof.

It is a further object of the present invention to provide a gear in which the annular groove is formed by forging.

It is a still further object of the present invention to provide a gear in which an axial lower end of the spline teeth on the hub synchro is positioned at the lower portion than an axial upper end of the transmission gear part.

It is a yet further object of the present invention to provide a gear in which a portion of the spline teeth for synchro is sunk into the transmission gear part in the axial direction and the spline teeth are formed at least in order to reach a bottom of the sink part.

According to the present invention it is able to make the effective part of the spline teeth for a synchro longer by forming the spline teeth for a synchro in order to reach the bottom of the sink part and reduce the thickness of the hub synchro.

It is a yet further object of the present invention to provide a method and a device for manufacturing a gear having a transmission gear part and a hub synchro having a spline teeth formed on an outer peripheral surface thereof and plurality of key hole formed in the opposite side of the transmission gear part, in which the hub synchro is coaxially provided with the transmission gear part, the diameter of the hub synchro is smaller than that of the transmission gear part, and comprises a forging process and a forging device for forming the spline teeth and the plurality of key holes on the hub synchro.

It is a further object of the present invention to provide a method and a device for manufacturing a gear having a forging step for forming an annular groove between the transmission gear part and the outer peripheral surface of the hub synchro on an axial one end thereof.

It is another object of the present invention to provide a method and a device for manufacturing a gear in which an axial lower end of the spline teeth on the hub synchro is positioned at the lower portion than an axial upper end of the transmission gear part.

It is a further object of the present invention to provide a method and a device for manufacturing a gear comprising a transmission gear part and a hub synchro having a spline teeth formed on an outer peripheral surface thereof and plurality of key holes formed in the opposite side of the transmission gear part, in which the hub synchro is formed integrally and coaxially with the transmission gear part, the diameter of the hub synchro is shorter than that of the transmission gear part and comprises a forging process for forming the spline teeth for synchro formed on the outer peripheral surface thereof by forging and the plurality of key holes formed in the opposite side of the transmission gear part by forging, and in which a portion of the spline teeth for synchro are sunk into the transmission gear part in the axial direction thereof, the spline teeth are formed at least in order to reach a bottom of the sink part and the spline teeth for synchro are formed of an imperfect form wherein a metal is projected in a radial direction, at the sink part.

In the method and a device of the present invention, when the spline teeth for a synchro are formed, metal depressed to the bottom of the hub synchro escapes in the radial directions thereof. Therefore, it is able to reduce the pressure and reduce the burden on the device.

It is a yet further object of the present invention to provide a method and a device for manufacturing a gear further comprising a cutting process for cutting the imperfect form of the bottom of the spline teeth for synchro in order to remove.

According to the present invention it is able to improve quality of the idler reverse gear by removing the imperfect part in which the metal escapes in the radial directions thereof, by cutting.

It is a still further object of the present invention to provide a method and a device for manufacturing a gear in which the forging process comprises a hot forging step and a cold forging step and wherein at least a thickness of the spline teeth synchro coming close to the key holes is set thickly.

When teeth lines are molded in ironing in the case the teeth lines incline, it is able to pretend an underfill from occurring by making the thickness of teeth thicker.

In the above described gear such as the idler reverse gear, the spline teeth for synchro may be sunk into the transmission gear part in the axial direction thereof and the spline teeth are formed at least in order to reach a bottom of the sink part of annular groove.

In the above described method and device for manufacturing the gear such as the idler reverse gear, the imperfect form of the bottom on the spline teeth for synchro is removed by cutting.

Moreover, in the above described method and device for manufacturing the gear such as the idler reverse gear, it is desirable that forging processes include a hot forging and a cold forging and at least a thickness of the spline teeth for synchro coming close to the key holes is set thickly.

BRIEF DESCRIPTION OF THE DRAWINGS

FIG. 3 is an enlarged illustrative view illustrating the bottom part of the spline teeth for a synchro;

DETAILED DESCRIPTION OF THE PREFERRED EMBODIMENTS

A basic form of the idler reverse gear as one example of the gear will be described below.

Figure 5:
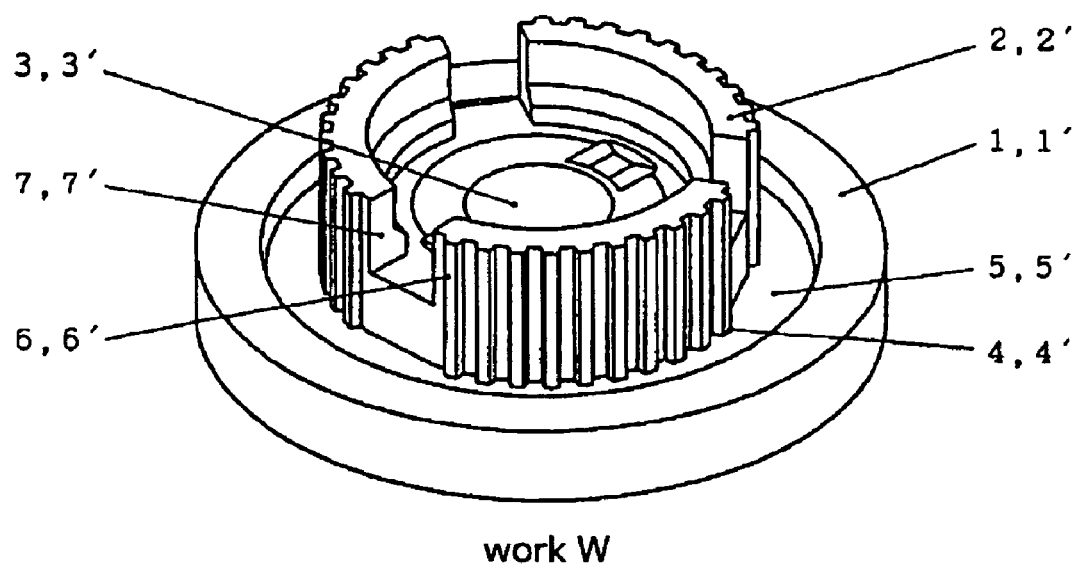
FIG. 5 is an illustrative view illustrating a basic form of the idler reverse gear.

As shown in FIG. 5, the idler reverse gear has a transmission gear part 1 and a hub synchro 2 in which the diameter of the hub synchro 2 formed integrally and coaxially with the transmission gear part is shorter than that of the transmission gear part 1, the hub synchro 2 is sunk into the transmission gear part in the axial direction thereof, and a penetrated axial hole is formed in the center of the idler reverse gear.

A sink part 4 on the hub synchro is surrounded with an annular concave 5 which is formed on an inner peripheral surface of the transmission gear part 1 and has a given width. Spline teeth for a synchro 6 are formed on an outer peripheral surface of the hub synchro 2 and a plurality of key ways 7,7'is formed in the opposite side of the sink part 4.

An idler reverse gear, a method and a device for manufacturing the idler reverse gear according to an aspect of the present invention will be described below.

Figure 1:
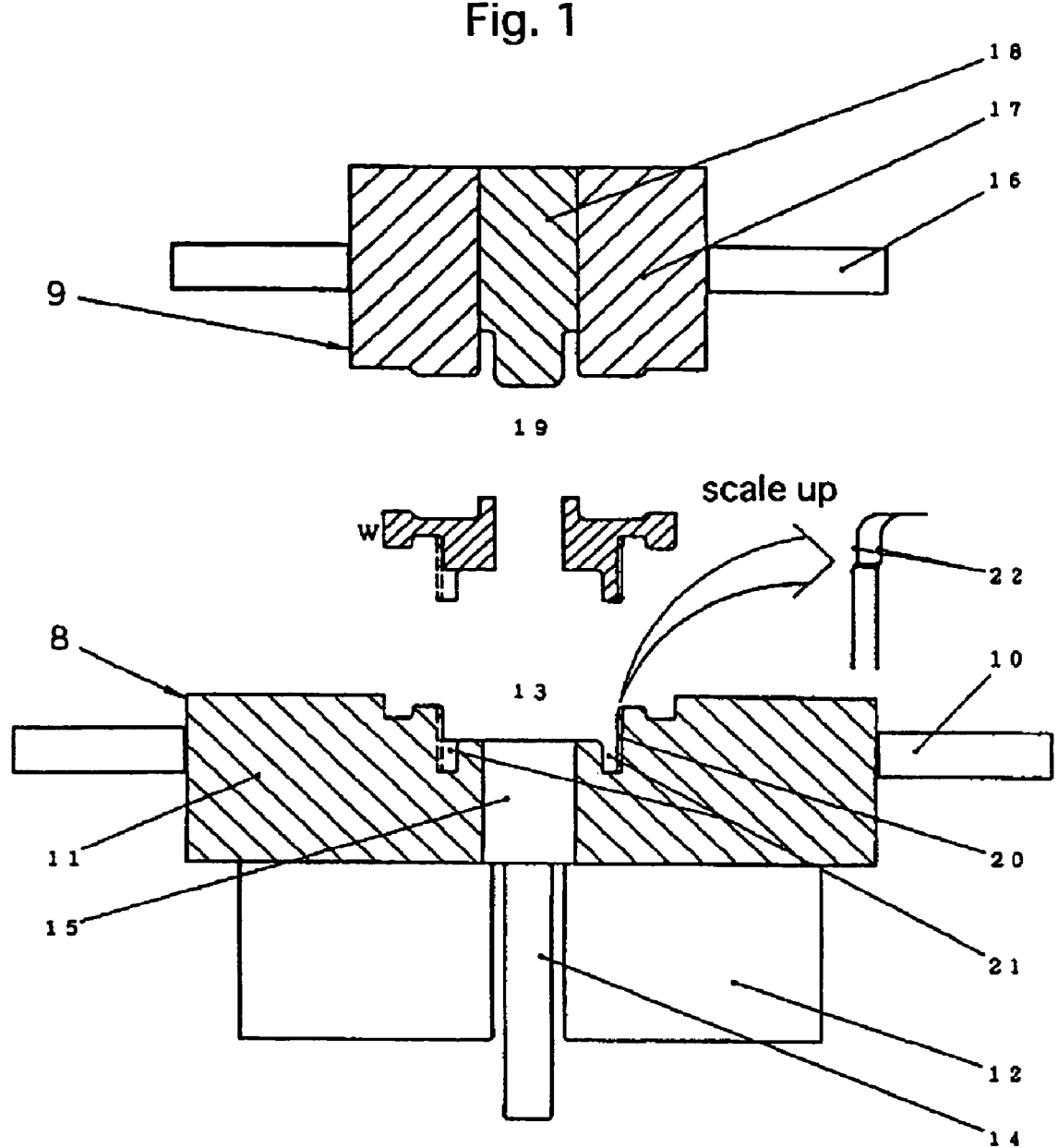
FIG. 1 is an illustrative view illustrating a cold forging device for manufacturing a gear such as an idler reverse gear according to the present invention.

FIG. 1 is an illustrative view illustrating a cold forging device, in which 8 is a drag, 9 is a cope, the drag 8 having a die 11 fastened with a fastening ring 10 is provided on a die plate 12 and a below cavity 13 corresponding to the form of the hub synchro side of the idler reverse gear is formed on the die 11.

An ejector 15 is provided on the bottom of the below cavity 13 so as to go up and down in conjunction with a knockout pin 14 penetrating the die plate 13.

The cope 9 comprises a punch 17 fastened and supported with the fastening ring 16 and a mandrel 18 equiped on the center of the punch 17. The punch 17 has a up-cavity 19 formed corresponding to the transmission gear part form of the idler reverse gear as a formed object.

The teeth for forming spline teeth for a synchro are formed on a part corresponding to an outer peripheral surface of a hub synchro in the below-cavity 13 formed on the die 11 in order to reach the bottom of the sink part. Key ways forming parts 21 are formed at three positions on a central part corresponding to the opposite side of the sink part of the hub synchro.

The teeth 20 for forming spline teeth for a synchro has a concave 22 concaved in the radial direction in order to escape, which is formed on a part corresponding to the bottom of the sink part of the spline teeth for a synchro.

A work W is setted on the drag 8 formed as described above and is depressed by the cope 9. On the hot forging step, the work W is obtained by heating up a steel product until a predetermined temperature, depressing, trimming an outer peripheral surface and an inner peripheral surface after rough finish to form, and if necessary, heat treatment, shot blast and lubricating treatment.

The work W has a transmission gear part 1' and a hub synchro 2' in which a diameter of the hub synchro 2' formed integrally and coaxially with the transmission gear part is shorter than that of the transmission gear part 1', the hub synchro 2' is sunk into the range of the transmission gear part 1' in the axial direction thereof, and a penetrated axial hole is formed in the center of the idler reverse gear (as shown in FIG. 5).

A sink part 4' of the hub synchro 2' is surrounded with an annular concave 5' which is formed on an inner peripheral surface at a side of the transmission gear part 1' and has a given width. Spline teeth for a synchro 6' are formed on an outer peripheral surface of the hub synchro 2' and a plurality of key ways 7', 7' are formed at three positions of the center in the opposite sides of the sink part 4'.

Figure 2:
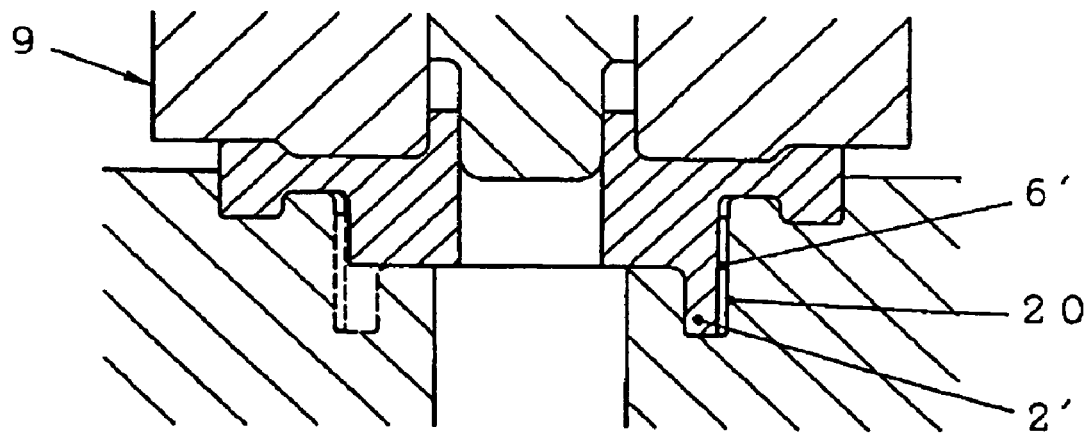
FIG. 2 is an illustrative view illustrating a process of molding spline teeth for a synchro by cold forging.

Spline teeth for a synchro 6', which has a wider thickness of teeth than an asked form, are formed on an outer peripheral surface of a hub synchro 2' in ironing by sending down the cope 9 having the teeth for forming spline teeth for a synchro (as shown in FIG. 2).

Pads escape into a concave for a escape 22 formed on die 11. The resultant spline teeth 23 for the synchro formed in ironing has a imperfect part 23a in which pads throw out in a radial directions thereof at the end part of the spline teeth (as shown in FIG. 3).

The imperfect part 23a of the spline teeth for a synchro shown by dotted line in FIG. 3, in which pads throw out in a radial directions thereof at the end part of the spline teeth 23 for a synchro, is removed by cutting.

Key ways are formed at the end part of the hub synchro of the idler reverse gear. Therefore, metal of the hub synchro has a tendency to flow and narrow widths of the key ways on completion of a hot forging process.

Figure 4:
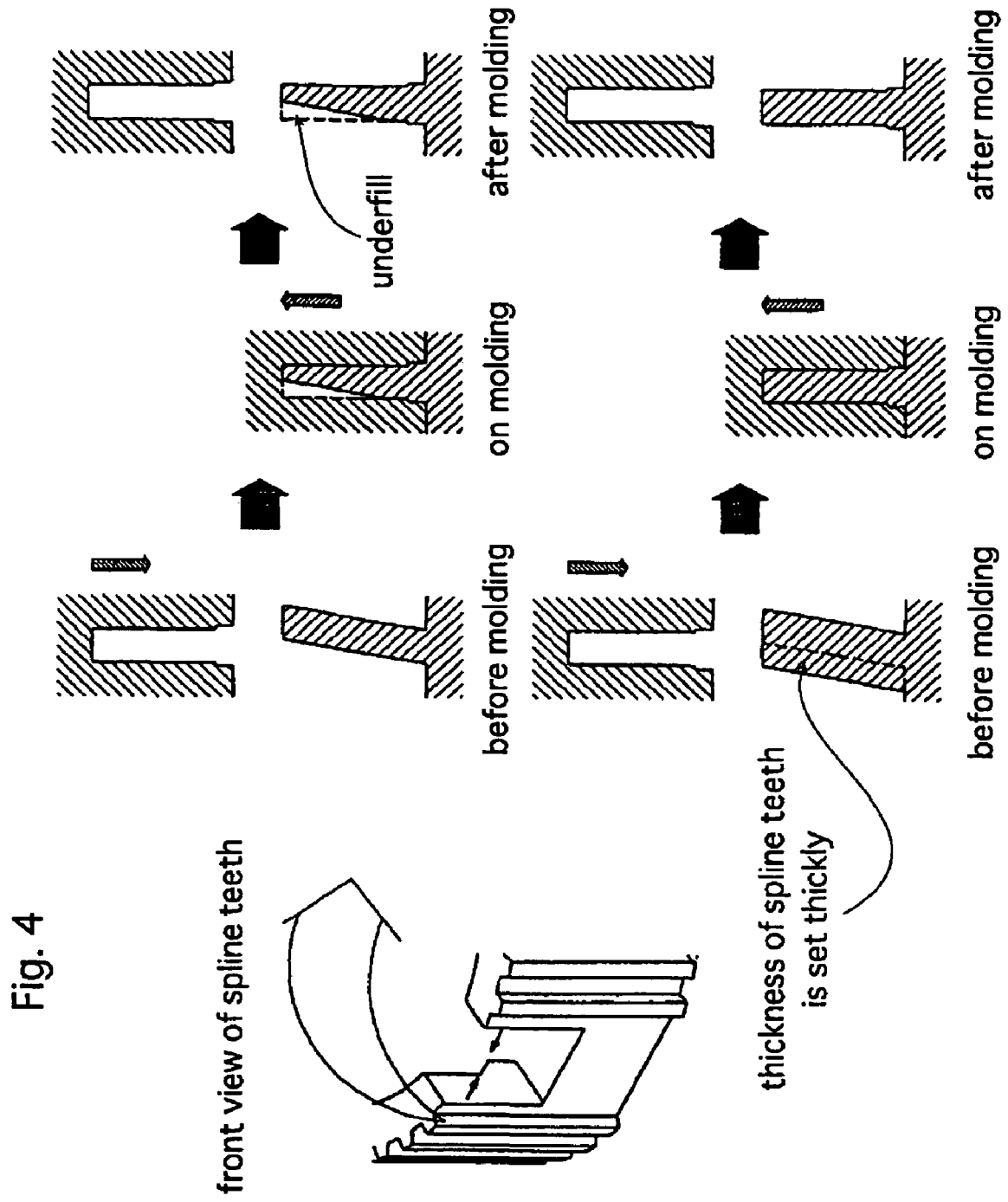
FIG. 4 is an enlarged illustrative view illustrating that the spline teeth for a synchro are formed in ironing.

When spline teeth for a synchro is formed to measure a size of a desired form, each teeth form is inclined toward the key ways. Therefore, an underfill occurs in ironing as shown at upper part of FIG. 4.

In this embodiment, the thickness of the spline teeth for a synchro of the work W are formed thickly and the thickness of the far side part from the key ways of the work is formed thickly. Therefore, an underfill doesn't occur in ironing as shown at lower part of FIG. 4.

Transmission teeth are formed on an outer peripheral surface of the transmission gear part by cutting and the transmission teeth can be formed by forging at the same time as forming the above described spline teeth for a synchro.

The idler reverse gear formed in this way as described above needs no build process as prior art due to one-piece molded article formed by forging.

Furthermore, a strain between the transmission gear part and the spline teeth for a synchro and distortions of phases between the transmission gear part, the spline teeth for a synchro and the key holes don't occur. And it attains a high rigidity and a high reliability.

In the above described embodiment, an imperfect part formed at the end part of the spline teeth for a synchro is removed and the thickness of the spline teeth for a synchro are made thicker. It is not necessary to remove the imperfect part formed at the end part of the spline teeth for a synchro and make the thicknesses of the spline teeth for a synchro thicker.

In the embodiment, the transmission gear part of the idler reverse gear has a sink part and the spline teeth for a synchro are formed until the bottom of the sink part. It is not necessary to form the spline teeth for a synchro in order to reach the bottom of the sink part and it is able to change accordingly the number of the key ways.

In the forging device of the embodiment, the form corresponding to the transmission gear part side of the idler reverse gear is formed on the coap 9 as the up-cavity and the form corresponding to the hub synchro of the idler reverse gear is formed on the drag 8 as the below-cavity. It is able to arrange the up-cavity and the below cavity in reverse order.

What is claimed is:

1. A gear comprising:
   a transmission gear part, and
   a hub synchro axially projected from a side surface of the transmission gear part, said hub synchro having first parts projecting axially from the side surface of the transmission gear part, and second parts projecting axially from the side surface of the transmission gear part and located between adjacent ones of said first parts, wherein said first parts have forged spline teeth formed on an outer peripheral surface of said first parts said first and second parts together form a complete circle,
   a plurality of forged key holes formed at said second parts of the hub synchro and extending entirely through a radial thickness of the wall of said hub synchro, said forged key holes extending to an axial end of said hub synchro opposite said transmission gear part, wherein said forged spline teeth of said hub synchro are not formed at circumferential positions of said second parts of said hub synchro where said forged key holes are provided,
   wherein said hub synchro is coaxially provided with said transmission gear part, the diameter of said hub synchro being smaller than that of said transmission gear part, and
   wherein the axial height of said second parts of said hub synchro located between two adjacent first parts of said hub synchro is smaller than the axial height of said first parts of said hub synchro.

2. A gear according to claim 1, further comprising an annular groove as a sink part formed between said transmission gear part and said outer peripheral surface of said hub synchro on one axial end thereof.

3. A gear according to claim 2, wherein said annular groove is forged.

4. A gear according to claim 3, wherein an axial lower end of said spline teeth on said hub synchro is positioned at a lower position within said sink part than an axial upper end of said transmission gear part.

5. A gear according to claim 3, wherein a portion of said spline teeth for said hub synchro is sunk into said transmission gear part in the axial direction and said spline teeth reach a bottom of said sink part.

6. A gear according to claim 1, wherein the axial length of said hub synchro is longer than that of said transmission gear part.

7. A gear according to claim 1, wherein said hub synchro forms a shoulder positioned such that a radial thickness in the portion of the hub synchro from said transmission part to the axial height of said second parts is greater than a radial thickness of said hub synchro in the portion of the hub synchro from the axial height of said second parts to the axial height of said first parts.

8. A gear comprising:
   a transmission gear part, and
   a hub synchro axially projected from a side surface of the transmission gear part, said hub synchro having first parts projecting axially from the side surface of the transmission gear part, and second parts projecting axially from the side surface of the transmission gear part and located between adjacent ones of said first parts, wherein said first parts have forged spline teeth formed on an outer peripheral surface of first parts of the hub synchro said first and second parts together form a complete circle,
   wherein said hub synchro is elongated throughout in the circumferential direction on said side surface of the transmission gear part,
   a plurality of forged key holes formed by end walls of said second parts and end walls of said first parts in the circumferential direction at said second parts of the hub synchro and extending entirely through a radial thickness of the wall of said hub synchro, said forged key holes extending to an axial end of said hub synchro opposite said transmission gear part, wherein said forged spline teeth of said hub synchro are not formed at an outer peripheral surface of said second parts of said hub synchro where said forged key holes are provided,
   wherein said hub synchro is coaxially provided with said transmission gear part, the diameter of said hub synchro being smaller than that of said transmission gear part, and
   wherein the axial height of said second parts of said hub synchro connected between two adjacent first parts of said hub synchro is smaller than the axial height of said first parts of said hub synchro.

9. A gear according to claim 8, wherein said hub synchro forms a shoulder positioned such that a radial thickness in the portion of the hub synchro from said transmission part to the axial height of said second parts is greater than a radial thickness of said hub synchro in the portion of the hub synchro from the axial height of said second parts to the axial height of said first parts.

* * * * *